United States Patent [19]

Tagami et al.

[11] Patent Number: 4,663,629

[45] Date of Patent: * May 5, 1987

[54] FIXED RANGE INDICATING SYSTEM FOR USE IN A VEHICLE TRAVEL PATH INDICATING APPARATUS

[75] Inventors: Katsutoshi Tagami; Tsuneo Takahashi, both of Saitama; Shinichiro Yasui, Tokyo; Masao Sugimura, Saitama, all of Japan

[73] Assignee: Honda Giken Kogyo Kabushiki Kaisha, Tokyo, Japan

[ * ] Notice: The portion of the term of this patent subsequent to Aug. 13, 2002 has been disclaimed.

[21] Appl. No.: 621,481

[22] Filed: Jun. 18, 1984

Related U.S. Application Data

[63] Continuation-in-part of Ser. No. 314,399, Oct. 23, 1981, abandoned.

[30] Foreign Application Priority Data

Oct. 27, 1980 [JP] Japan .................................. 55-150370

[51] Int. Cl.[4] .............................................. G06F 15/50
[52] U.S. Cl. .................................... 340/995; 340/988; 364/449; 364/424
[58] Field of Search ............... 340/988, 989, 990, 992, 340/993, 994, 995; 364/424, 434, 449

[56] References Cited

U.S. PATENT DOCUMENTS

| | | | |
|---|---|---|---|
| 4,024,493 | 5/1977 | Ingels | 340/995 |
| 4,139,889 | 2/1979 | Ingels | 340/995 |
| 4,192,002 | 3/1980 | Draper | 340/995 |
| 4,196,473 | 4/1980 | Chea | 364/449 |
| 4,240,108 | 12/1980 | Levy | 340/995 |
| 4,312,577 | 1/1982 | Fitzgerald | 340/995 |
| 4,402,050 | 8/1983 | Tajami et al. | 340/995 |
| 4,484,284 | 11/1984 | Tajami et al. | 364/449 |

*Primary Examiner*—Gerald L. Brigance
*Attorney, Agent, or Firm*—Irving M. Weiner; Joseph P. Carrier; Pamela S. Burt

[57] ABSTRACT

A fixed range indicating system is provided for the vehicle travel path indicating apparatus. The vehicle travel path indicating apparatus includes a locational data source having a pulse generator and producing vehicle locational data, memories for successively storing the vehicle locational data, a data reader for reading the travel path data from the memories, and a display unit for displaying a travel path of the vehicle on a display screen based on the travel path data read out by the data reader. The fixed range indicating system in such apparatus comprises a pulse counter for counting the pulses from the pulse generator, a data extractor for extracting a fraction of the locational data each time the travel distance is increased by a predetermined distance and for delivering the extracted data fraction as stored locational data to the memories to form stored travel path data, and a data restoring circuit for preparing restored travel path data based on the stored travel path data read out by the data reader from the memories and the locational data issued from the locational data source, the display means displaying the travel path of the vehicle on the display screen based on the restored travel path data.

3 Claims, 4 Drawing Figures

| Number in PULSE COUNTER | | Running distance (m) | 16-bit locational data from LOCATIONAL DATA SOURCE: | 4-bit stored data: | | |
|---|---|---|---|---|---|---|
| Decimal | Binary | | | 1/12,500 | 1/25,000 | 1/50,000 |
| 0 | 0000000000000000 | 0.0000 | 0000000000000000 | 0000 | 0000 | 0000 |
| 1 | 0000000000000001 | 0.1563 | 0000000000000000 | | | |
| 2 | 0000000000000010 | 0.3126 | 0000000000000000 | | | |
| 3 | 0000000000000011 | 0.4689 | 0000000000000000 | | | |
| ... | ... | ... | ... | ... | ... | ... |
| 31 | 0000000000011110 | 4.8453 | 0000000000000011 | 0011 | | |
| 32 | 0000000000100000 | 5.0016 | 0000000000000011 | | | |
| 63 | 0000000000111110 | 9.8469 | 0000000000000111 | 0111 | 0011 | |
| 64 | 0000000001000000 | 10.0032 | 0000000000000111 | | | |
| 96 | 0000000001100000 | 15.0048 | 0000000000001010 | 1010 | 0111 | |
| 128 | 0000000010000000 | 20.0064 | 0000000000001110 | 1110 | | 0011 |
| 160 | 0000000010100000 | 25.0080 | 0000000000010010 | 0010 | 1010 | |
| 192 | 0000000011000000 | 30.0096 | 0000000000010101 | 0101 | 1110 | |
| 224 | 0000000011100000 | 35.0112 | 0000000000011001 | 1001 | 0111 | |
| 256 | 0000000100000000 | 40.0128 | 0000000000011100 | 1100 | | |
| ... | ... | ... | ... | ... | ... | ... |
| 640 | 0000001010000000 | 100.0320 | 0000000001001000 | 1000 | 0100 | 0111 |

FIG.4

FIXED RANGE INDICATING SYSTEM FOR USE IN A VEHICLE TRAVEL PATH INDICATING APPARATUS

This application is a continuation-in-part of application Ser. No. 314,399, filed 10/23/81 now abandoned.

BACKGROUND OF THE INVENTION

1. Field of the Invention

The present invention relates to a vehicle travel path indicating apparatus, and more particularly to a path data storage system serving as a fixed range indicating system for use in a vehicle travel path indicating apparatus.

2. Description of the Prior Art

There have been known and used many different locational data sources for providing two-dimensional coordinates which represent the position of a moving vehicle and are continuously updated. One of the known locational data sources is composed of a range or distance sensor for generating a signal dependent on the distance that the vehicle has traveled, an azimuth sensor for generating a signal dependent on the heading of the vehicle, and a computer or an electric circuit for processing the signals from these sensors to issue vehicle locational data. Since such a locational data source is relatively small in size, less costly to construct, and requires no external equipment such for example as a reference-point wave transmitting station, it is suitable especially for use in a navigation system for small-size vehicles such as automobiles. The locational data source of this type is employed in a navigation system disclosed in U.S. Pat. Nos. 4,139,889 and 3,789,198.

The navigation system revealed in U.S. Pat. No. 4,139,889 comprises a locational data source and a display such as a CRT. In the disclosed navigation system, a point indicating the position of the vehicle is plotted on the display in accordance with locational data issued from the locational data source.

There are also known improved navigation systems which display the path that the vehicle has traveled as well as the current vehicle position. These improved navigation systems are advantageous in that the travel path can be recognized, and also in that even when vehicle locational data are incorrect due to an error caused by the locational data source, a relatively correct vehicle location can be deduced by comparing the features of a travel path pattern indicated on the display with those of a road pattern on a map (which may be superimposed on the display screen. The improved navigation systems comprise a locational data source for issuing vehicle locational data which are continuously updated, a memory for sequentially storing the vehicle locational data as travel path data, and a display unit for plotting a series of dots indicative of the travel path of the vehicle on a display such as a CRT. Such navigation systems are shown in U.S. Pat. Nos. 4,071,895, 4,400,780, and 4,402,050.

The prior navigation systems however have had the following problem, i.e., although the actual location of the vehicle can be deduced more correctly if the storage intervals of locational data are rendered so short that the path is indicated with a continuous smooth curve, such shortening of the storage interval requires a larger-capacity memory, a larger-size system, and a higher cost of manufacture.

SUMMARY OF THE INVENTION

The present invention has been made in an effort to eliminate the above prior difficulties.

According to the present invention, a fixed range indicating system is provided for the vehicle travel path indicating apparatus which includes a locational data source which comprises a pulse generator for generating a pulse each time the travel distance of the vehicle is increased by a predetermined first distance, an azimuth sensor for generating an azimuth signal corresponding to the heading of the vehicle, and computing means for computing changes in the location of the vehicle as two-dimensional coordinates from the first distance and the azimuth signal each time the pulse is received and for accumulating the location changes to produce vehicle locational data which is updated each time the pulse is received; memory means for successively storing the vehicle locational data issued from the locational data source to form a travel path data; reader means for reading the travel path data from the memory means; and display means for displaying a travel path of the vehicle on a display screen based on the travel path data read out by the reader means.

In such vehicle travel path indicating apparatus, the fixed range indicating system according to the present invention comprises a pulse counter for counting the pulses from said pulse generator; data extracting means for extracting a fraction of said locational data each time said travel distance is increased by a predetermined second distance and for delivering the extracted data fraction as stored locational data to said memory to form stored travel path data, said second distance being greater than said first distance; data restoring means for preparing restored travel path data based on said stored travel path data read out by said reader means from said memory means and said locational data issued from said locational data source; and said display means displaying the travel path of the vehicle on the display screen based on said restored travel path data.

Accordingly, it is an object of the present invention to provide a vehicle travel path indicating apparatus employing a small-capacity memory for storing locational data at smaller intervals than would be possible heretofore, so that a vehicle travel path can be displayed with a continuous smooth curve.

The above and further objects, details and advantages of the present invention will become apparent from the following detailed description of a preferred embodiment thereof, when read in conjunction with the accompanying drawings.

DESCRIPTION OF THE PREFERRED EMBODIMENT

Figure 1:
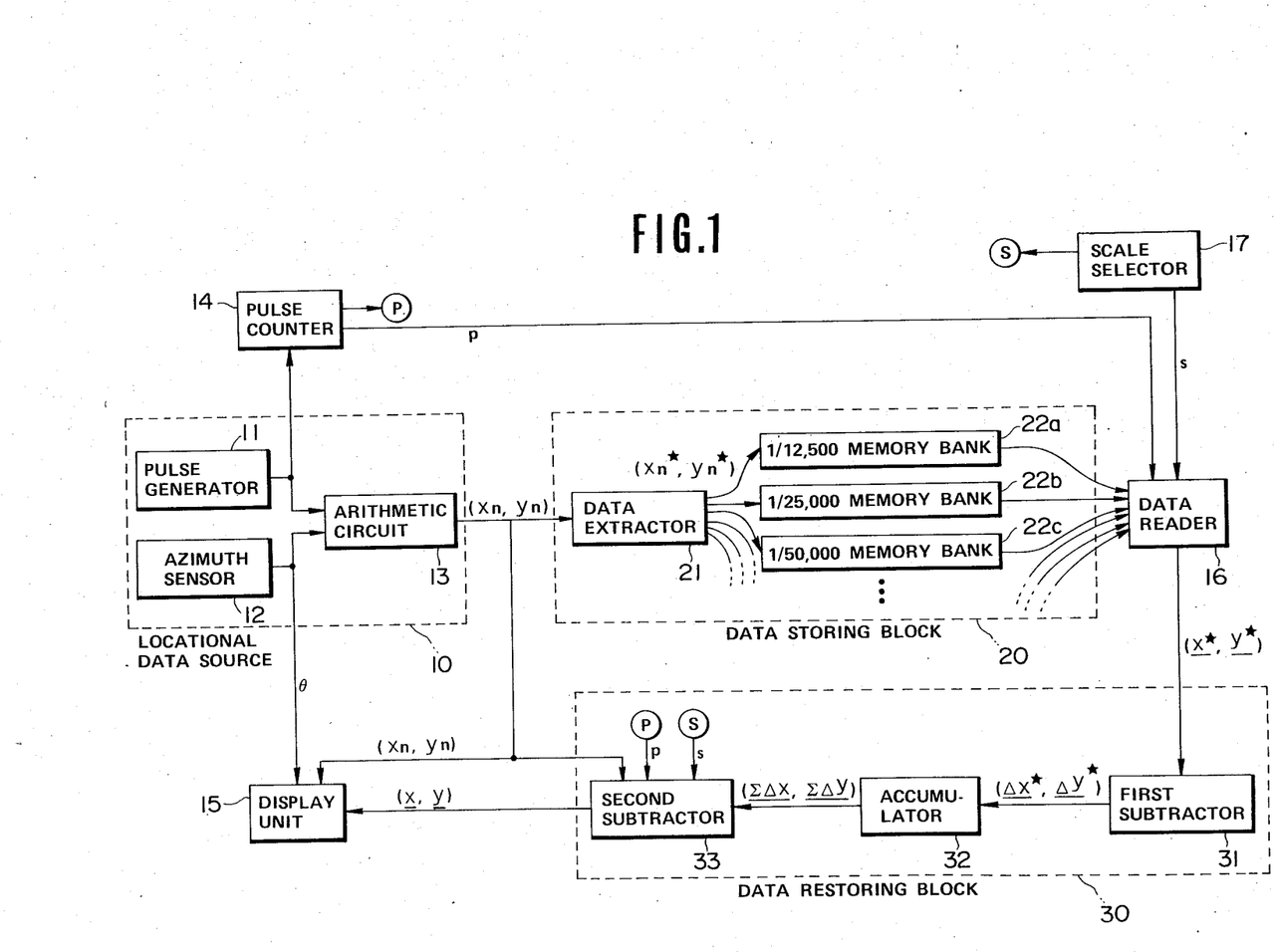
FIG. 1 is a block diagram of a vehicle travel path indicating apparatus according to a preferred embodiment of the present invention.

FIG. 1 shows in block form the principal arrangement of a fixed range indicating system for use in a vehicle travel path indicating apparatus according to a preferred embodiment of the present invention. The fixed range indicating system is mostly composed of a computer. The functions indicated by respective blocks in FIG. 1 are well known in a general computer, and may be combined sequentially or on a time-sharing basis for making up the system.

A locational data source 10 is basicaly of a known construction having a pulse generator 11 for generating a single pulse each time the vehicle travel distance is increased a predetermined unit travel distance (l), an azimuth or heading sensor 12 for generating an azimuth signal ($\theta$) indicative of the heading of the vehicle, and an arithmetic circuit 13 for computing changes in the location of the vehicle as two-dimensional coordinates based on the pulse from the pulse generator 11 and the azimuth signal ($\theta$), and accumulating the locational changes to issue two-dimensional locational data ($x_n$, $y_n$) representing the location of the vehicle and updated each time a pulse is received.

The arithmetic circuit 13 effects the computations expressed by the following equations:

$$\begin{cases} x_n = l\Sigma\cos\theta_k \\ y_n = l\Sigma\sin\theta_k \end{cases}$$

$$(k = 0, 1, 2, \ldots, n)$$

The unit travel distance (l) is determined as 0.1563 (m) in the system illustrated in FIG. 1.

The accumulating operations according to the above equations are carried out using 26-bit binary numbers. The binary data has the highest bit corresponding to an actual distance of 45,500 (m) and the lowest bit to an actual distance of $1.356 \times 10^{-3}$ (m) ($45,500 \times 2^{-25} = 1.356 \times 10^{-3}$). Therefore, the maximum actual distance that can be expressed by the binary data is 91,000 (m). The locational data output from the locational data source 10, is however, 16-bit data composed of the upper sixteen bits of the 26-bit data, and the lowest bit thereof corresponds to an actual distance of 1.389 (m) ($1.356 \times 10^{-3} \times 2^{10} = 1.389$).

The pulses generated by the pulse generator 11 are counted by a pulse counter 14 which is a 24-bit binary counter. The azimuth signal ($\theta$) generated from the azimuth sensor 12 is also fed directly to a display unit 15, which is basically the same as the display unit employed in the known navigation system, such as disclosed in U.S. Pat. No. 3,899,769.

The two-dimensional locational data ($x_n$, $y_n$) is sent to a data storing block 20 and a data restoring block 30 which are supplied from the pulse counter 14 with a count signal "p" indicating the number of pulses counted.

The fixed range indicating system also includes a data reader 16 for reading out travel path data stored in memory banks 22a, 22b, 22c, . . . in the data storing block 20 and sending the travel path data to the data restoring block 30, and a scale selector 17 for applying a selected-scale signal "s" representative of a selected display scale to the data reader 16 and the data restoring block 30.

The present invention is primarily characterized by the data storing block 20 and the data restoring block 30 which coact with each other for storing enough data to indicate a travel path in a small-capacity memory. The data storing block 20 and the data restoring block 30 will hereinafter be described in detail.

The data storing block 20 serves to pick up, out of the 16-bit locational data ($x_n$, $y_n$) from the locational data source 10, four bits at bit positions corresponding to predetermined six display scales and omit the other bits, to prepare 4-bit data ($x_n^*$, $y_n^*$), and store it in the memory banks 22a, 22b, 22c, . . . dedicated to the respective display scales. According to the system shown in FIG. 1, the six display scales include 1/12,500, 1/25,000, 1/50,000, 1/100,000, 1/200,000 and 1/400,000, with the ratio between any adjacent scales being 1:2. The 4-bit locational data are extracted from the 16-bit locational data in such manner that any display error on the display screen due to the omission of the lower bits should be about 0.1 (mm) in the display at any scale. Therefore, the lowest four bits of the 16-bit locational data are extracted to be the 4-bit stored data for the scale of 1/12,500. Since the lowest bit of the 16-bit locational data corresponds to the actual distance of 1.389 (m) as described above, the maximum value of the display error of the 4-bit data is about 0.1 (mm) ($1.389/12,500 \approx 0.1 \times 10^{-3}$). For the scale of 1/25,000, the four bits from the second through the fifth lowest bits of the 16-bit locational data serve as stored data. Since the lowest bit of this 4-bit data corresponds to the actual distance of 2.778 (m), the maximum value of the display error of the 4-bit data due to the omission of the lowest bit of the 16-bit data is also about 0.1 (mm) ($2.778/25,000 \approx 0.1 \times 10^{-3}$). Likewise, for the scales of 1/50,000, 1/100,000, 1/200,000, and 1/400,000, the four bits from the third through the sixth lowest bits of the 16-bit locational data, the four bits from the fourth the seventh lowest bits, the four bits from the fifth through the eighth lowest bits, and the four bits from the sixth through the ninth lowest bits serve as stored data ($x_n^*$, $y_n^*$), respectively. The above operation is effected by a first data extractor 21 in the data storing block 20, and the 4-bit locational data are stored in the memory banks 22a, 22b, 22c, . . . in the data storing block 20.

Another feature relating to the data storing block 20 is concerned with the interval at which the 4-bit data ($x_n^*$, $y_n^*$) are stored. More specifically, the interval between any two adjacent displayed dots on the display screen based on two successive stored locational data should be small enough for a series of displayed dots to be viewed as a continuous smooth curve, but the interval is not required to be smaller than such an extent. According to the system shown in FIG. 1, the above requirement is met by storing positional data for each display scale each time the travel distance is increased by a distance (d) which is predetermined corresponding to each display scale. The travel distance (d) is determined as 5.00 (m) ($5.00/12,500 = 0.4 \times 10^{-3}$) for the scale of 1/12,500, and as 10.0 (m), 20.0 (m), 40.0 (m), 80.0 (m), and 160 (m) respectively for the scales of 1/25,000, 1/50,000, 1/100,000, 1/200,000, and 1/400,000 in order that the interval between any two successive dots on the display screen should be 0.4 (mm) at any display scale. To store the locational data in this manner dependent on the vehicle travel distance, the data extractor 21 for preparing the 4-bit locational data ($x_n^*$, $y_n^*$) from the 16-bit locational data ($x_n$, $y_n$) is supplied with the count signal "p" from the pulse counter 14, the count signal "p" being indicative of the states of respective bits of the pulse counter 14. Since the lowest bit of the pulse counter 14 corresponds to the travel distance of 0.1563 (m), as described above, the number at the sixth lowest bit of the pulse counter 14 changes from 1 to 0 or 0 to 1 each time the vehicle travel distance is increased 5.00 (m) ($0.1563 \times 2^5 = 5.00$). Therefore, each time the number at the sixth lower bit of the pulse counter 14 changes, the data extractor 21 operates to extract the lowest four bits of the 16-bit locational data to prepare 4-bit data, and deliver the prepared data to the memory bank 22a for the display scale of 1/12,500. Similarly, each time the numbers at the seventh, eighth, ninth, tenth, and eleventh lowest bits of the pulse counter 14 changes, the data extractor 21 prepares 4-bit data for the display scales of 1/25,000, 1/50,000, 1/100,000, 1/200,00, and 1/400,000, respectively, and stores the 4-bit data in the corresponding memories 22b, 22c, . . . . The locational data ($x_n^*$, $y_n^*$) stored sequentially at predetermined intervals form 4-bit travel path data ($\underline{x}^*$, $\underline{y}^*$) (The underlines indicate that the data are sequential).

Figure 2:
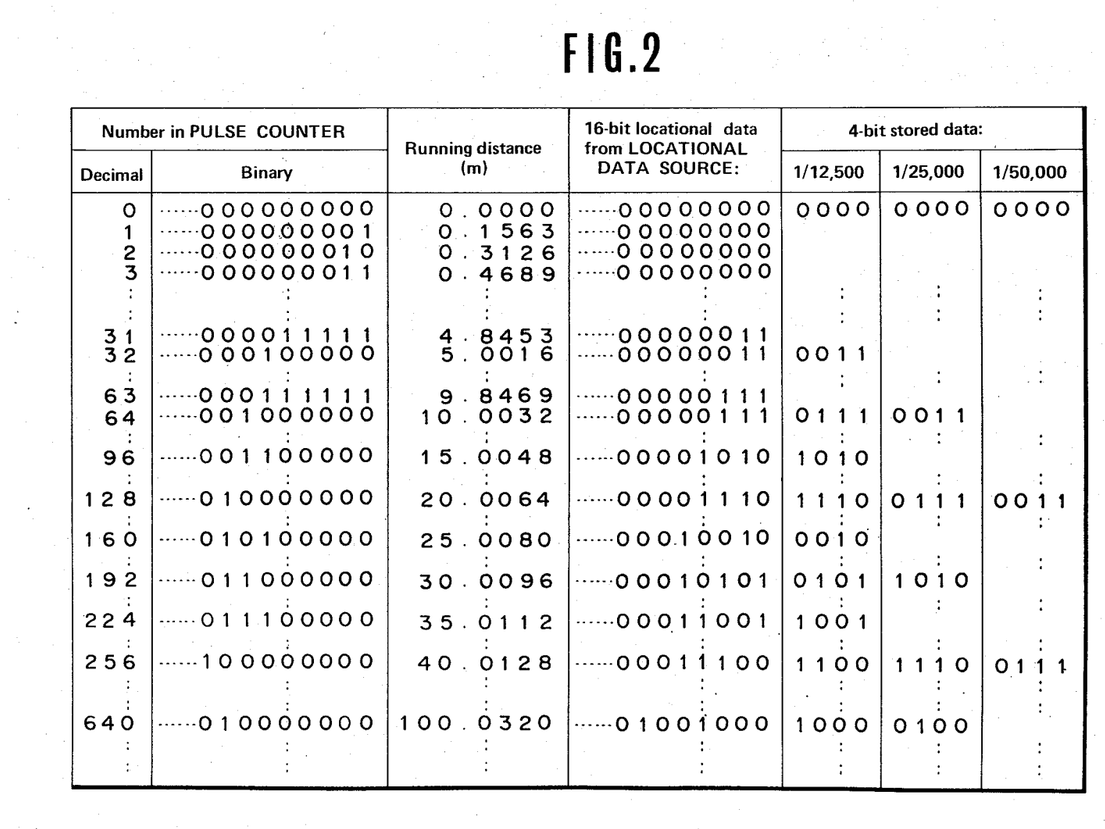
FIG. 2 is a table showing, by way of example, of a locational data storing process explanatory of the function of a fixed range indicating system in the vehicle travel path indicating appratus shown in FIG. 1.

For a better understanding of the data storing block 20, the table of FIG. 2 is utilized to show the relations between the travel distances of the vehicle, binary number in the pulse counter 14 and their decimal equivalents, the values of x coordinate of 16-bit locational data, the values of x coordinate of 4-bit stored locational data for the scales of 1/12,500, 1/25,000, and 1/50,000, and the timing of storing these 4-bit locational data. The data shown in the table are obtained when the vehicle runs from just on the Y-axis along the X-axis, and hence the running distances in the table are equal to the values of x coordinate of the 16-bit locational data. It should be noted that the actual distance corresponding to the lowest bit of the pulse counter is 0.1563 (m) and the actual distance corresponding to the lowest bit of the 16-bit locational data is 1.389 (m).

Data restoration will now be described. The display unit 15 in the system shown in FIG. 1 has a CRT (cathode-ray tube) having a square screen of a size 110 (mm)×110 (mm). The longitude and latitude of the screen correspond respectively to x and y coordinates. The length of 110 (mm) on the screen corresponds to the actual distance of 2,750 (m) when the display scale is 1/25,000. Since the lowest bit of the 4-bit stored travel path data ($\underline{x}^*$, $\underline{y}^*$) for the scale of 1/25,000 corresponds to the actual distance of 2.778 (m), binary travel path data having at least ten bits with the lowest bit thereof corresponding to the actual distance of 2.778 (m) should be restored from the 4-bit stored travel path data ($\underline{x}^*$, $\underline{y}^*$) in order to be able to indicate any dot on the display screen. The indication in the other display scales also require restored data having at least ten bits.

Restoring of the travel path data in the systems of FIG. 1 for the display scale of 1/25,000 will hereinafter be described.

In a first restoring process, the data reader 16 sequentially reads out 4-bit locational data ($x_k^*$, $y_k^*$), in the order from latest to previous data, from the memory bank 22b for the scale of 1/25,000 according to a selected scale signal a from the scale selector 17 which is indicative of the selected scale of 1/25,000, and then delivers the read out data to a first subtractor 31 in the data restoring block 30. The timing at which the data reader 16 starts to read out will be described later on.

In a second restoring process, the first subtractor 31 computes the difference ($x_k^*$, $y_k^*$) between one 4-bit locational data ($x_{k+1}^*$, $y_{k+1}^*$) in the 4-bit travel path data ($\underline{x}^*$, $\underline{y}^*$) and the sequentially read out 4-bit locational data ($x_k^*$, $y_k^*$) which is the data stored therein immediately prior to the 4-bit locational data ($x_{k+1}^*$, $y_{k+1}^*$). This subtraction is successively effected with reducing "k" one by one from (n−1), and the successively computed differences are delivered to an accumulator 32. The sequence of the data differences ($\Delta x_k^*$, $\Delta y_k^*$) are indicated by ($\underline{\Delta x}^*$, $\underline{\Delta y}^*$). The above operation is expressed by the following equations:

$$\begin{cases} \Delta x_k^* = x_{k+1}^* - x_k^* \\ \Delta y_k^* = y_{k+1}^* - y_k^* \end{cases}$$

$$(k = n - 1, n - 2, \ldots, 0)$$

In a third restoring process, the accumulator 32 computes a cumulative total ($\Sigma \Delta x_m$, $\Sigma \Delta y_m$) from first data difference ($\Delta x_{n-1}^*$, $\Delta y_{n-1}^*$) to the m-th data difference ($\Delta x_{n-m}^*$, $\Delta y_{n-m}^*$) in the data difference sequence, with incrementing m one by one from 1, and delivers the total to a second subtractor 33. The sequence of cumulative totals ($\Sigma \Delta x_m, \Sigma \Delta y_m$) is indicated by ($\underline{\Sigma \Delta x}, \underline{\Sigma \Delta y}$). The above operation is expressed by the following equations:

$$\begin{cases} \Sigma \Delta x_m = \Delta x^*_{n-1} + \Delta x^*_{n-2} + \ldots + \Delta x^*_{n-m} \\ \Sigma \Delta y_m = \Delta y^*_{n-1} + \Delta y^*_{n-2} + \ldots + \Delta y^*_{n-m} \end{cases}$$

$$(m = 1, 2, \ldots, n)$$

The values of the cumulative difference totals should be of at least 10 bits so as to cover the full range of the display screen. According to the system of FIG. 1, a blank high-order bit is added to each of the cumulative totals, and all of the cumulative difference totals are issued as 11-bit numbers from the accumulator 32.

The cumulative difference total ($\Sigma \Delta x_m, \Sigma \Delta y_m$) thus determined is indicative of relative position of the location represented by locational data ($x_{n-m}^*$, $y_{n-m}^*$) stored m-times earlier, with respect to the location represented by the latest stored locational data ($x_n^*$, $y_n^*$). An important point in this respect is to compensate for the error caused by the omission of the higher bits which have been omitted at the time the 4-bit locational data have been extracted from the 16-bit locational data. Such compensation will be described with reference to the following tables 1 and 2 showing the case that the vehicle runs from just on the Y-axis along the X-axis for 100 (m). Since the display scale is 1/25,000 in this case, a locational data is stored each time the vehicle runs 10.0 (m), and a total of eleven locational data are stored. The first to the fourth bits of the stored locational data correspond respectively to the actual distances of 22.22 (m), 11.11 (m), 5.555 (m), and 2.778 (m). The upper eight bits of the 16-bit locational data are omitted from illustration in these tables 1 and 2. The stored locational data are composed of the second to the fifth lowest bits of the 16-bit locational data.

TABLE 1

| Data number: n | Actual distance from Y-axis (m) | 16-bit locational data from locational data source: $x_n$ | 4-bit stored data: $x_n^*$ |
|---|---|---|---|
| 0 | 0 | . . . . . . . . 000000000 | 0000 |
| 1 | 10 | . . . . . . . . 000000111 | 0011 |

TABLE 1-continued

| Data number: n | Actual distance from Y-axis (m) | 16-bit locational data from locational data source: $x_n$ | 4-bit stored data: $x_n^*$ |
|---|---|---|---|
| 2 | 20 | ........000001110 | 0111 |
| 3 | 30 | ........000010101 | 1010 |
| 4 | 40 | ........000011100 ⎫* | 1110 |
| 5 | 50 | ........000100100 ⎭ | 0010 |
| 6 | 60 | ........000101011 | 0101 |
| 7 | 70 | ........000110010 | 1001 |
| 8 | 80 | ........000111001 ⎫* | 1100 |
| 9 | 90 | ........001000000 ⎭ | 0000 |
| 10 | 100 | ........001001000 | 0100 |

TABLE 2

| Data number: n | 4-bit stored data: $x_n^*$ | Data difference: $\Delta x_k^*$ | 11-bit cumulative values of data differences: $\Sigma \Delta x_m + C$ | Restored distance from the latest stored location |
|---|---|---|---|---|
| 10 | 0100 | ... | ... | ... |
| 9 | 0000 | 0100 | 0000000100 | 11.1 |
| 8 | 1100 | −1100 | 0000001000 | 22.1 |
| 7 | 1001 | 0011 | 0000001011 | 30.6 |
| 6 | 0101 | 0100 | 0000001111 | 41.7 |
| 5 | 0010 | 0011 | 0000010010 | 50.0 |
| 4 | 1110 | −1100 | 0000010110 | 61.1 |
| 3 | 1010 | 0100 | 0000011010 | 72.2 |
| 2 | 0111 | 0011 | 0000011101 | 80.5 |
| 1 | 0011 | 0100 | 0000100001 | 91.7 |
| 0 | 0000 | 0011 | 0000100100 | 100.0 |

C: a constant (10000 in binary notation) to be added to the cumulative values of data differences when a carry-up is detected, and subtracted from the cumulative values of data differences when a carry-down is detected.

Figure 3:
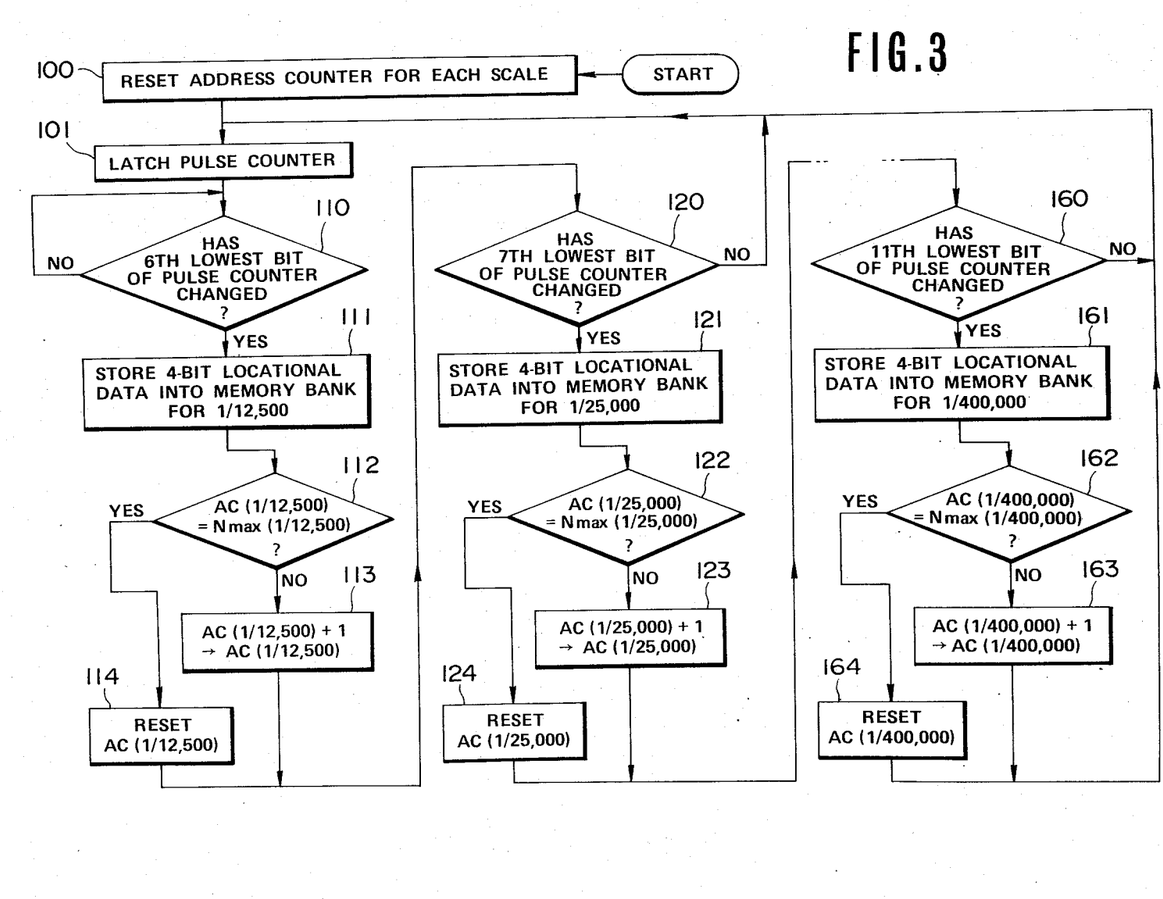
FIG. 3 is a flow chart for a data storing block shown in FIG. 1.

It should be considered here that there may occur a carry-up or a carry-down, between the sixth lowest bit and the fifth lowest bit of the 16-bit location data (the latter is the highest bit of the 4-bit data). As shown in the table 1, there are carry-ups bridging such bits between the fifth 16-bit data ($x_4$) and the sixth 16-bits data ($x_5$), and also between the ninth 16-bits data ($x_8$) and the tenth 16-bit data ($x_9$), where * is affixed. As shown in the table 2, these carry-ups are detected by the fact the value of the data difference is negative and its highest bit is "1". When such a carry-up is detected, the number (=10000 in binary notation) which the 4-bit data have lost due to the carry up is added to the cumulative total of differences. The cumulative totals of differences shown in FIG. 3 are the values after such compensation. If the data difference is positive and its highest bit "1", then it indicates a carry-down, and the number (10000 in binary notation) which the 4-bit data have gained due to the carry-down is subtracted from the cumulative totals of differences for compensation. The reason why carry-ups and carry downs can be detected by the fact the highest bit of the data difference is "1" is that the actual distance (=22.22 m) corresponding to the highest bit is greater than the sum of the data storing interval (=10.0 (m)) and the maximum value (=2.778 (m)) of an error caused by the omission of the low-order digits of the locational data. As long as this relationship is met, the frequency of storing locational data and the values of actual distances corresponding to the respective bits may be changed. As an example, even when only the upper two bits of the 4-bit data are stored, the necessary travel path data can be restored on the basis of such 2-bit data though the display error becomes larger.

In a fourth and final process for restoring travel path data, travel path data (x, y) of the vehicle with respect to the starting point is derived from the 16-bit locational data ($x_n$, $y_n$) at the time the latest 4-bit data is stored and the sequence of cumulative totals ($\Sigma \Delta x$, $\Sigma \Delta y$) of differences representative of relative positions. The data restoring block 30 has a second subtractor 33 for performing this process. More specifically, the second subtractor 33 sequentially subtracts each data in the sequence of the cumulative difference totals from the 16-bit locational data ($x_n$, $y_n$) issued at the above described time from the locational data source 10. The results of such subtraction are then delivered successively to the display unit 15. It is important here that the 16-bit locational data used in the subtraction process should be concurrent with the latest data ($x_n^*$, $y_n^*$) of the stored locational data, and the bits of the cumulative difference totals should be shifted to upper or lower digits dependent on the scale upon subtraction since the different scales have the different actual distances corresponding to the highest bits of the cumulative difference totals for each scale. To these ends, the second subtractor 33 is continuously supplied with the selected-scale signal from the scale selector 17 and the count signal from the pulse counter 14. The second subtractor 33 operates in response to these supplied signals for latching the 16-bit locational data ($x_n$, $y_n$) every time the 4-bit data for the selected scale is stored, through the period when the reading out of the stored data is not effected. When the stored data start being read, the second subtractor 33 holds the 16-bit locational data which is latched at that time, until a sequence of locational data are completely read out. The second subtractor 33 next determines the differences between the held data and the cumulative difference totals ($\Sigma \Delta x_m$, $\Sigma \Delta y_m$) which are sequentially entered, and delivers the differences as a sequence of restored travel path data (x, y) to the display unit 15.

The foregoing operation for restoring the travel path data is performed by a 16-bit CPU (central processing unit). It takes a certain length of time to complete the entire travel path restoring process. One period allotted by the CPU to the travel path data restoring process is however too short to complete the restoring process since the function of the locational data source is performed also by the same CPU on a time-sharing basis. With the above limitation in view, the system of FIG. 1 is constructed to effect a single data restoring process over a number of allotted periods. More specifically, the data reader 16 is supplied with the count signal "p" from the pulse counter 14, and responds to the count signal "p" by starting to read 4-bit travel path data (x*, y*) from the memory banks in the data storing block 20 each time the vehicle has traveled a fixed distance "C". The second subtractor 33 in the data restoring block 30 is also responsive to the count signal "p" from the pulse counter 14 for latching the 16-bit locational data ($x_n$, $y_n$) received at the time to thereby start the foregoing operation. The first subtractor 31 and the accumulator 32 start operating at the same time that they are supplied with the 4-bit travel path data (x*, y*) and the data differences ($\Delta x^*$, $\Delta y^*$). A displayed travel path based on the data thus restored is held by the display unit 15 until next data are restored, and is then updated by the next restored data. The fixed distance "C" may be rendered shorter as the speed of operation of the CPU becomes higher.

A first advantage accruing from the display of a vehicle travel path is that even when vehicle locational data are incorrect due to an error caused by the locational data source, a relatively correct vehicle location can be deduced by comparing the features of a travel path pattern displyed on the display with those of a road pattern on a map. The displayed vehicle travel path is not required to be continuously updated, but may be updated each time the vehicle has traveled a relatively long fixed distance "C" However, the displayed current vehicle location should preferably be continuously updated so that the speed and direction of travel of the vehicle can be known. To meet such a requirement, the system of FIG. 1 is arranged such that the 16-bit locational data ($x_n$, $y_n$) from the locational data source 10 and the azimuth signal ($\theta$) from the azimuth sensor 12 in the locational data source are delivered directly to the display unit 15 for displaying on the display screen a current-location indicating mark capable of indicating the heading of the vehicle. The current-location indicating mark is therefore updated each time the vehicle travel distance is increased by a unit travel distance (l).

Each memory bank in the data storing block 20 is composed of an 8-bit RAM (random-access memory) connected to the CPU. As each of the x and y coordinates of the stored data is expressed by a 4-bit number, high-order 4 bits of the eight bits are assigned to the x coordinates, while low-order 4 bits to the y coordinates. The 8-bit data are stored into the memory area for each scale successively from an address having a smallest address number to addresses having successively larger address numbers. After the data have been stored at an address having a largest address number, the data are stored again in the address with the smallest address number. Stated otherwise, the data are stored in a storage system operating in an endless mode. With this storage system, the memory for each scale is provided with an address counter which is incremented by 1 each time data are stored.

FIG. 3 represents a flow chart illustrating the data processing to be accomplished by the data storing block. As the data storing is effected so as to form six independent travel path data for respective display scales, six address counters are required of the storing block. Each address counter is reset, or set with the minimum address in the range alloted to the memory bank for the corresponding scale, at stage 100. In order to store the data at the interval predetermined according to the scale, the current number in the pulse counter is compared at the decision stage 110 with the latched number in the pulse counter which is latched at stage 101 before the decision stage 110. If the sixth lowest bit of the current number in the pulse counter and that of the latched number is the same, it means that the travel distance has not been increased by the distance of 5.00 (m) (which is the interval for storing the data for 1/12,500 scale), and the comparing at stage 110 will be repeated. When it is detected by the comparing that the travel distance is increased by such distance, then flow proceeds to stage 111, where a 4-bit locational data is extracted from the current 16-bit locational data and is stored in the memory bank for 1/12,500 scale. After the storing, stage 112 queries whether or not the number in the address counter for 1/12,500 scale (which address counter will be represented by "AC(1/12,500)") has reached to the maximum address in the range alloted to the memory bank for 1/12,500 scale (which address will be represented by "Nmax (1/12,500)"). If not, the number in AC(1/12,500) is increamented by "1" at stage 113. Otherwise, AC(1/12,500) is reset at stage 114 in the same manner as is reset at stage 100. From stage 113 or 114 flow proceeds to stage 120, where the current number in the pulse counter is compared with the latched number as to their seventh lowest bits so as to query whether or not the travel distance has been increased by the distance of 10.00 (m), which is the interval of the storing of the data for 1/25,000 scale. If not, flow returns to stage 101, where the number in the pulse counter is newly latched, or updated. Otherwise, flow proceeds to stage 121, then to decision stage 122, and then to stage 123 or 124. The stages 120 through 124 are the same with the stages 110 through 114 described above, respectively, except that the former stage set is for storing the data for 1/25,000 scale. Though the same stage sets for 1/50,000, 1/100,000, 1/200,000 and 1/400,000 are provided, former three sets are omitted from FIG. 3 and only the last set composed of stages 160 through 164 is shown, for simplification of the figure.

Figure 4:
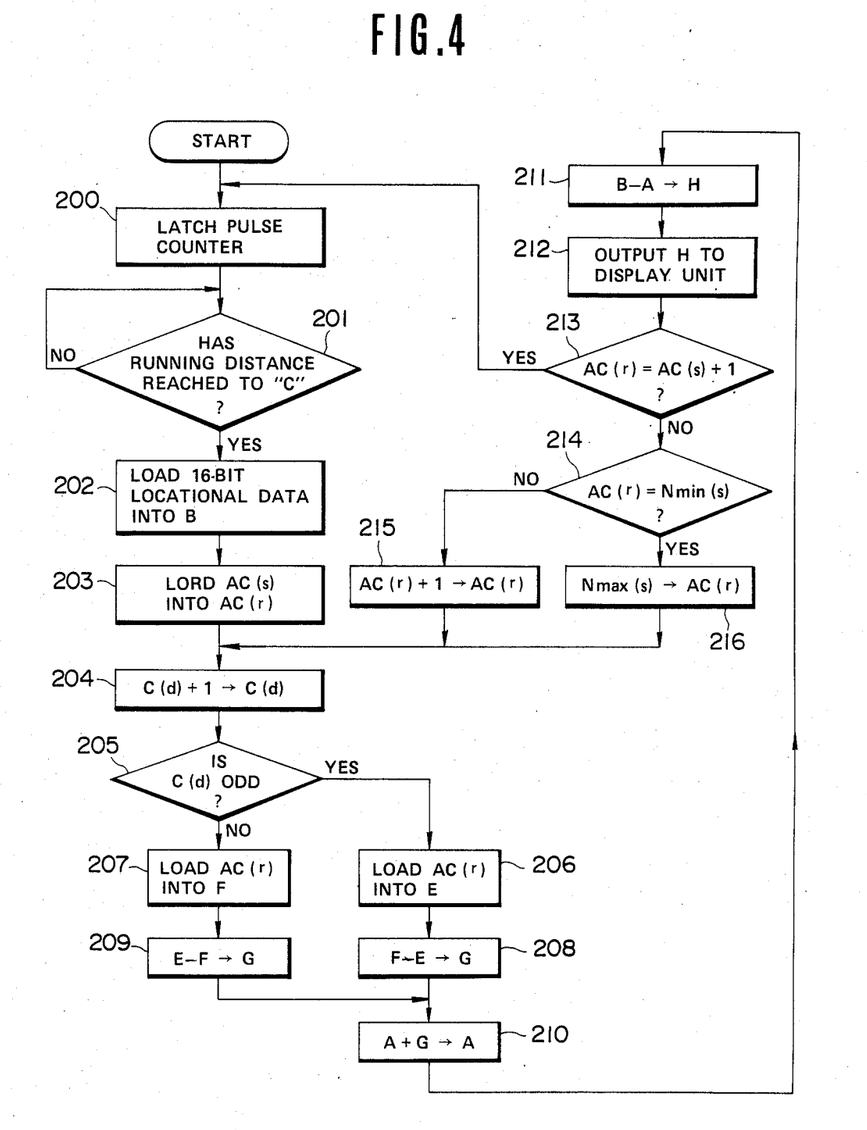
FIG. 4 is a flow chart for a data restoring block shown in FIG. 1.

FIG. 4 represents a flow chart illustrating the data processing to be accomplished by the data reader and the data restoring block. Stage 200 latches the number in the pulse counter. Then stage 201 queries whether or not the travel distance has been increased by the distance "C" corresponding to the interval for restoring the travel path data, by comparing the significant bit of the current number with that of the latched number of the pulse counter. If not, the comparing will be repeated at stage 201. When the travel distance has been increased by the distance "C", flow proceeds to stage 202, where the 16-bit locational data at that moment is loaded into B-register.

As the reading out of the stored data and the restoring the travel path data are effected according to the selected scale, the address counter for the selected scale will be specifically represented by "AC(s)" among the six address counters described above. Also, there is provided another address counter which is used for the reading out, it will be represented by "AC(r)".

After stage 202, flow proceeds to stage 203, where the number in AC(s) at that time is loaded into AC(r). Then flow proceeds to stage 204, for which a counter C(d) is provided in order to load the read out data alternately into D-register and E-register. The stage 204 increments the counter C(d) by "1", and then decision stage 205 queries whether or not the number is odd by comparing the lowest bit thereof with "1". If it is odd, the data at the address indicated by AC(r) is loaded into E-register by stage 206. If not, it is loaded into F-register by stage 207. From stage 206 flow proceeds to stage 208 which subtracts the number in E-register from the number in F-register and loads the result into G-register, while from stage 207 flow proceeds to stage 209 which subtracts the number in F-register from the number in E-register and loads the result into G-register. The number in G-register is the data difference derived by the 1st subtractor. Such number is accumulated in A-register by stage 210. The number in A-register is the cumulative data difference total derived by the accumulator. Then flow proceed to stage 211 which subtracts the number in A-register from the number in B-register and loads the result into H-register the number in H-register is the restored data derived by the 2nd subtractor, and is output to the display unit by stage 212.

Thus, one of the stored data has been read out and one of the restored data has been obtained. Since the reading out and the restoring of the data should be successively effected, flow is to proceed back to stage 204 to form the loop for such processes. However, there are stages 213 through 216 before flow proceeds to stage 204.

Stages 214 through 216, which are described prior to stage 213, serve to properly controle AC(r). More particularly, stage 214 queries whether or not the number in AC(r) has been reduced to the minimum address in the range alloted to the memory bank for the seleeted scale (which address will be represented by "Nmin(s)"). If not, the number in AC(r) is decremented by "1" by stage 215, and then flow proceeds back to stage 204. If the number in AC(r) is equal with Nmin(s), flow proceeds to stage 216 which resets AC(r), or sets AC(r) with the maximum address in the range alloted to the memory bank for the selected scale (which address will be represented by "Nmax(s)"). Then flow proceeds back to stage 204.

Stage 213 serve to stop the reading out of the data when whole data has been read out from the memory bank. As described above, AC(s) is continuously incremented according to the running of the vehicle and reset with Nmin(s) when it becomes Nmax(s). Also, AC(r) is continuously decremented according to the repetition of the reading out loop and reset with Nmax(s) when it becomes Nmin(s). Therefore, the reading out of the stored data should be stopped just before AC(r) and AC(s) intercross with each other. For this purpose, stage 213 queries whether or not the number in AC(r) is just "1" greater than the number in AC(s). If not, flow proceeds from this stage to stage 214 so as to repeat the loop for the reading and the restoring of the data. If the numbers in AC(s) and AC(r) meet the above condition, flow proceeds back to stage 200 so that one sequence of the reading out and the restoring of the data is completed.

Although there have been described what is at present considered to be the preferred embodiment of the invention, it will be understood that the invention may be embodied in other specific forms without departing from the spirit or essential characteristics thereof. The present embodiment is therefore to be considered in all respects as illustrative, and not restrictive. The scope of the invention is indicated by the appended claims rather than by the foregoing description.

We claim:

1. In a vehicle travel path indicating apparatus, including:
   a locational data source which comprises a pulse generator for generating a pulse each time the travel distance of the vehicle is increased by a predetermined first distance, an azimuth sensor for generating an azimuth signal corresponding to the heading of the vehicle, and computing means for computing changes in the location of the vehicle as two-dimensional coordinates from said first distance and said azimuth signal each time said pulse is received and for accumulating the location changes to produce vehicle locational data which is updated each time said pulse is received;
   memory means for successively storing the vehicle locational data issued from said locational data source to form a travel path data;
   reader means for reading said travel path data from said memory means; and
   display means for displaying a travel path of the vehicle on a display screen based on said travel path data read out by said reader means,
   a fixed range indicating system comprising:
   (a) a pulse counter for counting the pulses from said pulse generator:
   (b) data extracting means for extracting a portion of said locational data from said locational data source each time said travel distance is increased by a predetermined second distance and for delivering the extracted data portion to said memory to form stored travel path data, said second distance being greater than said first distance;
   (c) data restoring means for preparing restored travel path data based on said stored travel path data read out by said reader means from said memory means and said locational data issued from said locational data source; and
   (d) said display means displaying the travel path of the vehicle on the display screen based on said restored travel path data.

2. A fixed range indicating system according to claim 1, further including a scale selector for generating a selected-scale signal indicative of a display scale selected among a plurality of predetermined display scales, wherein:
   said memory means comprises a plurality of memory banks respectively for said plurality of predetermined display scales;
   said second distance is predetermined according to each of said display scales; and
   said reader means is responsive to said selected-scale signal for starting to read out said stored travel path data for said selected display scale from one of said memory banks corresponding to said selected display scale each time the travel distance of the vehicle is increased by a fixed distance and delivering said stored travel path data to said data restoring means, said fixed distance being greater than said second distance.

3. A fixed range indicating system according to claim 2, wherein:
   said data restoring means comprises a first subtractor for sequentially determining and delivering differences between two successive said stored locational data, an accumulator for accumulating said locational data differences and delivering a cumulative value each time one data difference is delivered so as to issue a sequence of cumulative values, and a second subtractor for sequentially determining differences between said locational data delivered from said locational data source and each one of said sequential cumulative values.

* * * * *

UNITED STATES PATENT AND TRADEMARK OFFICE
CERTIFICATE OF CORRECTION

PATENT NO. : 4,663,629  
DATED : May 5, 1987  
INVENTOR(S) : Katsutoshi TAGAMI et al.

Page 1 of 3

It is certified that error appears in the above-identified patent and that said Letters Patent is hereby corrected as shown below:

Column 4, line 34, after "$10^{-3}$." insert --For the scale of 1/25,000, the four bits from the second through the fifth lowest bits of the 16-bit locational data serve as stored data. Since the lowest bit of this 4-bit data corresponds to the actual distance of 2.778 (m), the maximum value of the display error of the 4-bit data due to the omission of the lowest bit of the 16-bit data is also about 0.1 (mm) (2.778/25,000 - 0.1 x $10^{-3}$).

line 21, change "$(x^*, y^*)$" to --$(\underline{x}^*, \underline{y}^*)$--;

line 47, change "$(x^*, y^*)$" to --$(\underline{x}^*, \underline{y}^*)$--;

lines 51-52, change "$(x^*, y^*)$" to --$(\underline{x}^*, \underline{y}^*)$--.

Column 6, line 2, change "$(x^*, y^*)$" to --$(\underline{x}^*, \underline{y}^*)$--;

line 9, change "$(\Delta x^*, \Delta y^*)$" to --$(\underline{\Delta x}^*, \underline{\Delta y}^*)$--.

line 13, change "$\Delta x_k^* = x_{k+1}^* - x_k^*$" to --$\underline{\Delta x}_k^* = x_{k+1}^* - x_k^*$--;

line 14, change "$\Delta y_k^* = y_{k+1}^* - y_k^*$" to --$\underline{\Delta y}_k^* = y_{k+1}^* - y_k^*$--;

line 26, change "$(\Sigma \Delta x, \Sigma \Delta y)$" to --$(\underline{\Sigma \Delta x}, \underline{\Sigma \Delta y})$--;

UNITED STATES PATENT AND TRADEMARK OFFICE
CERTIFICATE OF CORRECTION

PATENT NO. : 4,663,629

DATED : May 5, 1987

INVENTOR(S) : Katsutoshi TAGAMI et al.

It is certified that error appears in the above-identified patent and that said Letters Patent is hereby corrected as shown below:

line 30, change "$\Sigma \Delta x_m = \Delta x^*_{n-1} + \Delta x^*_{n-2} + \ldots + \Delta x^*_{n-m}$" to --$\Sigma \Delta x_m = \Delta x_{n-1}{}^* + \Delta x_{n-2}{}^* + \ldots + \Delta x_{n-m}{}^*$--;

line 31, change "$\Sigma \Delta y_m = \Delta y^*_{n-1} + \Delta y^*_{n-2} + \ldots + \Delta y^*_{n-m}$" to --$\Sigma \Delta y_m = \Delta y_{n-1}{}^* + \Delta y_{n-2}{}^* + \ldots + \Delta y_{n-m}{}^*$--;

Column 7, line 22, change "22.1" to --22.2--;

line 45, change "carry up" to --carry-up--;

line 53, change "carry downs" to --carry-downs--.

line 67, change "(x, y)" to --($\underline{x}$, $\underline{y}$)--.

UNITED STATES PATENT AND TRADEMARK OFFICE
CERTIFICATE OF CORRECTION

PATENT NO. : 4,663,629

DATED : May 5, 1987

INVENTOR(S) : Katsutoshi TAGAMI et al.

It is certified that error appears in the above-identified patent and that said Letters Patent is hereby corrected as shown below:

Column 8, line 2, change "$(\Sigma\Delta x, \Sigma\Delta y)$" to --$(\underline{\Sigma\Delta x}, \underline{\Sigma\Delta y})$--;

lines 34-35, change "$(x, y)$" to --$(\underline{x}, \underline{y})$--;
lines 50-51, change "$(x^*, y^*)$" to --$(\underline{x^*}, \underline{y^*})$--;
line 59, change "$(x^*, y^*)$" to --$(\underline{x^*}, \underline{y^*})$--;
line 60, change "$(\Delta x^*, \Delta y^*)$" to --$(\underline{\Delta x^*}, \underline{\Delta y^*})$--.

Signed and Sealed this

Fifth Day of April, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,663,629

DATED : May 5, 1987

INVENTOR(S) : Katsutoshi, TAGAMI et al.

It is certified that error appears in the above-identified patent and that said Letters Patent is hereby corrected as shown below:

Column 1, line 51, after "screen" insert right parenthesis;
    line 66, correct the spelling of --requires--.

Column 4, line 34, after "$10^{-3}$." insert --For the scale of 1/25,000, the four bits from the second through the fifth lowest bits of the 16-bit locational data serve as stored data. Since the lowest bit of this 4-bit data corresponds to the actual distance of 2.778 (m), the maximum value of the display error of the 4-bit data due to the omission of the lowest bit of the 16-bit data is also about 0.1 (mm) ($2.778/25,000 - 0.1 \times 10^{-3}$).

Column 5, line 17, change "1/200,00," to --1/200,000--;
    line 21, change "$(x^*, y^*)$" to --$(\underline{x}^*, \underline{y}^*)$--;
    line 47, change "$(x^*, y^*)$" to --$(\underline{x}^*, \underline{y}^*)$--;
    lines 51-52, change "$(x^*, y^*)$" to --$(\underline{x}^*, \underline{y}^*)$--.

Column 6, line 2, change "$(x^*, y^*)$" to --$(\underline{x}^*, \underline{y}^*)$--;
    line 9, change "$(\Delta x^*, \Delta y^*)$" to --$(\underline{\Delta x}^*, \underline{\Delta y}^*)$--.
    line 13, change "$\Delta x_k^* = x_{k+1}^* - x_k^*$" to --$\Delta x_k^* = x_{k+1}^* - x_k^*$--;
    line 14, change "$\Delta y_k^* = y_{k+1}^* - y_k^*$" to --$\Delta y_k^* = y_{k+1}^* - y_k^*$--;
    line 26, change "$(\Sigma \Delta x, \Sigma \Delta y)$" to --$(\underline{\Sigma \Delta x}, \underline{\Sigma \Delta y})$--;

UNITED STATES PATENT AND TRADEMARK OFFICE
CERTIFICATE OF CORRECTION

PATENT NO. : 4,663,629                          Page 2 of 3

DATED       : May 5, 1987

INVENTOR(S) : Katsutoshi, TAGAMI et al.

It is certified that error appears in the above-identified patent and that said Letters Patent is hereby corrected as shown below:

line 30, change "$\Sigma \Delta x_m = \Delta x^*_{n-1} + \Delta x^*_{n-2} + \ldots + \Delta x^*_{n-m}$" to --$\Sigma \Delta x_m = \Delta x_{n-1}{}^* + \Delta x_{n-2}{}^* + \ldots + \Delta x_{n-m}{}^*$--;

line 31, change "$\Sigma \Delta y_m = \Delta y^*_{n-1} + \Delta y^*_{n-2} + \ldots + \Delta y^*_{n-m}$" to --$\Sigma \Delta y_m = \Delta y_{n-1}{}^* + \Delta y_{n-2}{}^* + \ldots + \Delta y_{n-m}{}^*$--;

Column 7, line 22, change "22.1" to --22.2--;

line 45, change "carry up" to --carry-up--;

line 53, change "carry downs" to --carry-downs--.

line 67, change "(x, y)" to --($\underline{x}$, $\underline{y}$)--.

Column 8, line 2, change "($\Sigma \Delta x$, $\Sigma \Delta y$)" to --($\underline{\Sigma \Delta x}$, $\underline{\Sigma \Delta y}$)--;

lines 34-35, change "(x, y)" to --($\underline{x}$, $\underline{y}$)--;

lines 50-51, change "(x*, y*)" to --($\underline{x^*}$, $\underline{y^*}$)--;

line 59, change "(x*, y*)" to --($\underline{x^*}$, $\underline{y^*}$)--;

line 60, change "($\Delta x^*$, $\Delta y^*$)" to --($\underline{\Delta x^*}$, $\underline{\Delta y^*}$)--.

Column 9, line 7, insert a period after "C".

Column 11, line 4, correct the spelling of --control--;

line 17, change "serve" to --serves--.

UNITED STATES PATENT AND TRADEMARK OFFICE
CERTIFICATE OF CORRECTION

PATENT NO. : 4,663,629

DATED : May 5, 1987

INVENTOR(S) : Katsutoshi, TAGAMI et al.

It is certified that error appears in the above-identified patent and that said Letters Patent is hereby corrected as shown below:

Column 9, line 7, insert a period after "C".
Column 11, line 4, correct the spelling of --control--;
      line 17, change "serve" to --serves--.

This certificate supersedes Certificate of Correction issued April 5, 1988.

Signed and Sealed this

Twenty-third Day of August, 1988

Attest:

DONALD J. QUIGG

Attesting Officer      Commissioner of Patents and Trademarks